Fig. 6.

| Curve of Fig. | A.W.M. Stator Plate | A.W.M. Speed | Max. effic. of A.W.M. at following combustion eng. speeds | Control of mass flow in A.W.M. | % Mass flow at following % R.P.M. | | |
|---|---|---|---|---|---|---|---|
| | | | | | 50% C.E. 700 R.P.M. C.E. 1050 R.P.M. | 75% C.E. 1050 R.P.M. | 100% C.E. 1400 R.P.M. |
| 1 (A-57) (S.N.741,260) | Adjustable | Variable with R.E. | All speed of R.E. | High vac. in low pressure stage | 100 | 100 | 100 |
| 2 (A-41) (S.N.637,570) | Fixed | Constant | High R.E. speed | Reflected wave | 60 | 85 | 100 |
| 3 (A-41) (S.N.637,570) | Fixed | Constant | Low R.E. speed | Reflected wave | 100 | 85 | 80 |
| 4 (A-41) (S.N.637,570) | Fixed | Constant | Compromise of 2 & 3 | Reflected wave | 80 | 100 | 90 |
| 5 | Fixed | Variable with R.E. | High R.E. speed | Mis-timing | 50 | 80 | 100 |
| 6 | Fixed | Variable with R.E. | Low R.E. speed | Mis-timing | 100 | 80 | 70 |
| 7 | Fixed | Variable with R.E. | Compromise of 5 & 6 | Mis-timing | 75 | 100 | 85 |
| 8 (A-64) | Fixed reduced size pick-up port | Variable with R.E. | Compromise of 5 & 6 | Reduced size of pick-up port | 90 | 98 | 95 |

United States Patent Office 3,012,708
Patented Dec. 12, 1961

3,012,708
WIDE SPEED RANGE PRESSURE EXCHANGER SUPERCHARGER
Max Berchtold, Paoli, and Sidney H. Abrams, Philadelphia, Pa., assignors to I-T-E Circuit Breaker Company, Philadelphia, Pa., a corporation of Pennsylvania
Filed Mar. 13, 1959, Ser. No. 799,285
13 Claims. (Cl. 230—69)

Our invention relates to an aero-dynamic wave machine or pressure exchanger used as a super-charger for a reciprocating engine in which the wave machine is driven by the variable speed of the reciprocating engine, and more particularly is directed to a novel arrangement wherein with fixed stator plates it is possible to minimize the mistiming of the compression and expansion waves to thereby reduce back-flow from the high pressure outlet port. With our novel arrangement of providing a predetermined angular relation between a reduced size high pressure outlet port and the high pressure inlet port, it is possible to have consistently high efficiency of the aerodynamic wave machine over a wide range of speed operation.

The operation of an aero-dynamic wave machine utilized in our instant invention is disclosed and illustrated in copending applications Serial No. 454,774, filed September 8, 1954, now U.S. Patent No. 2,970,745, issued February 7, 1961, entitled Wave Engine, by Max Berchtold; Serial No. 647,091, filed March 19, 1957, now U.S. Patent No. 2,959,344, issued November 8, 1960, entitled Reverse Cycle Aerodynamic Wave Machine, by Ernst Niedermann; Serial No. 637,570, filed January 31, 1957, entitled Reverse Cycle Aerodynamic Wave Engine, by Max Berchtold, all assigned to the assignee of the instant invention. However, in these prior art devices in which there are fixed stator plates for a constant speed aerodynamic wave machine or fixed stator plates for a variable speed aero-dynamic wave machine driven from the reciprocating engine, there is a decreasing efficiency due to the changes in the mass flow requirements of the reciprocating engine, i.e., changing r.p.m. of the reciprocating engine.

In the operation of an aero-dynamic wave machine, it is usually necessary to have a drive or control means to provide timing for the waves. If the aero-dynamic wave machine is used as a super-charger, it is most advantageous to obtain the necessary power to drive the aerodynamic wave machine from the reciprocating engine. This can be achieved by any number of means, such as a belt drive, hydraulic drive, electrical drive, etc. The most economical and simple of these is the standard V belt drive. However, since most reciprocating engines operate over a range of engine speed the aero-dynamic wave machine speed deviates at certain operating speeds from optimum conditions and efficiency and may, therefore, be substantially decreased due to mis-timing of the waves.

Although it is desirable to have the aero-dynamic wave machine super-charger driven at a constant speed independent of the reciprocating engine speed, in practice, the speed, and thus the mass flow requirements, of the reciprocating engine vary and hence the prior art fixed drive aero-dynamic wave machine would not be efficient through the entire speed range of the reciprocating engine. However, a belt drive from the reciprocating engine to the aero-dynamic wave machine, in the absence of an adjustable stator plate, is not desirable since the wave sequence of propagation and arrival is radically upset.

In copending application Serial No. 742,601, filed June 17, 1958, entitled Adjustable Stator Plate for Variable Speed Aero-Dynamic Wave Machine, by Max Berchtold, there is shown an arrangement whereby the variable speed drive from the combustion engine to the pressure exchanger is utilized and the pressure exchanger is provided with a continuously adjustable stator plate so that the ports are constantly being angularly repositioned to ensure proper timing at all speeds. This arrangement provides maximum efficiency over the speed range of the pressure exchanger. However, this is achieved at the sacrifice of a rather complicated mechanical construction which not only adds expense to the pressure exchanger, but also increases the mechanical failures, inspection, maintenance and adjustments.

With the arrangement of our present invention, the efficiency is slightly reduced over the range of speed operation when compared to the adjustable plate arrangement, but has a consistently higher efficiency over the range of speed operation than all other prior art wave machines or pressure exchangers.

We provide a novel arrangement wherein the high pressure outlet port is smaller than the high pressure inlet port and angularly positioned with respect thereto so that the compression waves created at the opening edge of the high pressure inlet port will terminate on the opening edge of the high pressure outlet port only when the pressure exchanger is operating at a maximum speed and the expansion wave created at the closing edge of the high pressure inlet port will terminate on the closing edge of the high pressure outlet port only when the pressure exchanger is operated at a reduced speed of approximately 50%. At a speed between these two extremes, the compression wave will terminate on the stator plate ahead of the high pressure outlet port and the expansion wave will terminate on the stator plate after the high pressure outlet port. With this novel arrangement both stator plates are stationary and are not continuously adjustable. This novel arrangement results in maximum efficiency when compared to all other prior art pressure exchangers except for the more expensive and complex continuously adjustable stator plate device shown in aforementioned copending application S.N. 742,601.

Our novel reduced size high pressure outlet port in a fixed stator plate is less expensive and also less complicated than the adjustable plate thereby eliminating all the problems of mechanical failure, inspection, maintenance and adjustment associated with the adjustable plate. Furthermore, the novel arrangement, our instant invention, has the advantage of having a controlled reduced mis-timing over the speed range to thereby not only reduce back-flow, but also reduce contamination at the high pressure air port.

There are many conditions such as starting, idling and low load conditions which may require extra controls. For example, in United States Patent 2,853,987, issued September 20, 1958, entitled Diesel Engine Supercharged by the Aerodynamic Wave Machine by Max Berchtold and Ernst Niedermann and assigned to the assignee of the instant invention, this is achieved by a throttle valve which effectively cuts off the ports during these conditions. This arrangement can be used with our instant invention to overcome the problem arising due to starting, idling, and low load conditions.

Accordingly, primary object of our invention is to provide an aero-dynamic wave machine which is to be utilized as a super-charger for a reciprocating engine which has stationary stator plates and has a variable speed drive in which the relation of the high pressure outlet port is reduced in size and angularly positioned with respect to the high pressure inlet port to intentionally have some mis-timing of both the compression and expansion wave at a mean speed and in which there is proper timing of the expansion wave at only a speed below the mean speed and proper timing of the compression wave at only a speed above the mean speed.

Another object of our invention is to provide a novel arrangement whereby the pressure exchanger can be belt driven by a reciprocating engine which it is to super charge and have stationary stator plates and still overcome all the disadvantages heretofore existing in variable speed machines.

A further object of our invention is to provide a pressure exchanger used as a super-charger which has a variable speed drive and stationary stator plates, but in which both the back-flow and contamination at the high pressure outlet port is either reduced or maintained at a minimum.

Another object is to provide a variable drive, stationary stator plate super-charger pressure exchanger in which the high pressure outlet port is constructed and angularly positioned with respect to the high pressure inlet port, so that the compression wave created at the opening edge of the high pressure inlet port will terminate on the stator ahead of the opening edge of the high pressure outlet port for all speeds other than maximum speed and will terminate at the opening edge at only maximum speed.

Another object is to provide a simple drive, for instance a standard V belt drive, stationary stator plate super-charge pressure exchanger in which the high pressure outlet port is constructed and angularly positioned with respect to the high pressure inlet port, so that the expansion wave created at the closing edge of the high pressure inlet port will terminate on the stator after the closing edge of the high pressure outlet port for all speeds above a predetermined minimum and will terminate at the closing edge at only the predetermined minimum speed.

Still another object of our invention is to provide a direct drive, stationary stator plate super-charger pressure exchanger in which the high pressure outlet port is constructed and angularly positioned with respect to the high pressure inlet port to prevent the early arrival of both compression and expansion waves to thereby eliminate back-flow into the high pressure outlet port by having slightly reduced efficiency of the pressure exchanger at design speed in favor of wider speed range of operation at optimum efficiency.

These and other objects of our invention will be apparent from the following description when taken in connection with the drawings in which.

Figure 1:
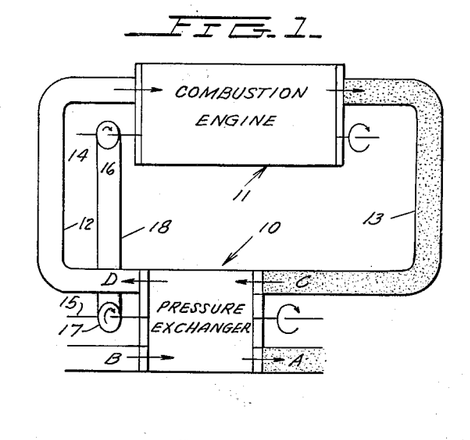
FIGURE 1 is a schematic representation of a pressure exchanger super-charging a reciprocating engine and shows a direct drive such as belt drive from the reciprocating combustion engine to the pressure exchanger.
Figure 1A:
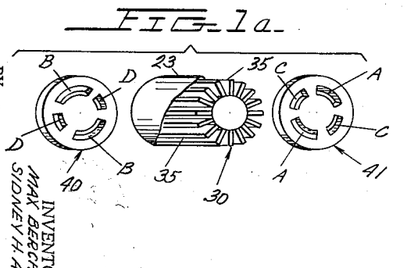
FIGURE 1a is a schematic perspective view of a pressure exchanger having reverse cycle with two cycles per revolution. This figure illustrates the rotor and ports within the stationary stator plates.
Figure 2:
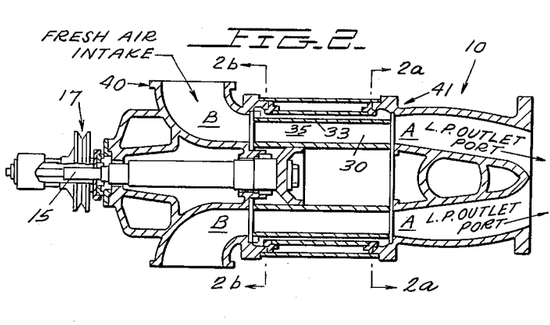
FIGURE 2 is a cross-sectional view of the rotor and stator plates taken in the direction of the arrows 2—2 of FIGURE 4.
Figure 2A:
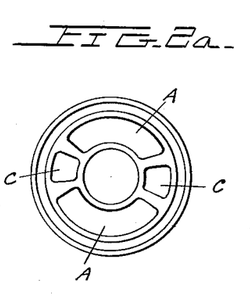
FIGURE 2a is a view taken in the direction of the arrows 2a—2a of FIGURE 2 and illustrates the hot stator plate with low pressure outlet ports and high pressure inlet ports.
Figure 2B:
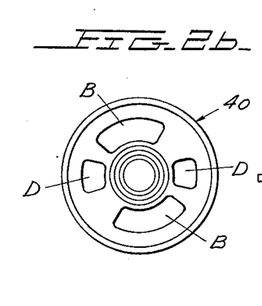
FIGURE 2b is a view taken in the direction of the arrows 2b—2b of FIGURE 2 and illustrates the cold stator plate with low pressure inlet ports and high pressure outlet ports.
Figure 3:
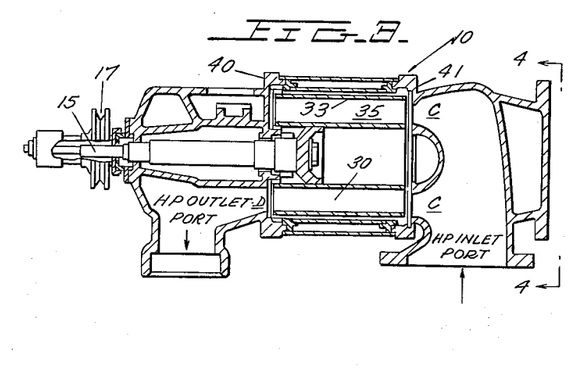
FIGURE 3 is another cross-sectional view of the rotor and stator similar to FIGURE 2 in which the left portion is taken in the direction of the arrows 3—3a of FIGURE 4 and the right portion of which is taken in the direction of the arrows 3—3b of FIGURE 4.
Figure 4:
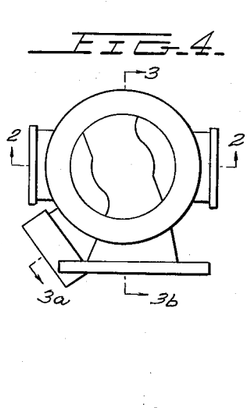
FIGURE 4 is an end view taken in the direction of the arrows 4—4 of FIGURE 3.

Referring to FIGURE 1, there is shown a schematic representation of a pressure exchanger 10 having a low pressure inlet port B for fresh air, a low pressure outlet port A to exhaust the hot gases, a high pressure outlet port D to supply compressed air through duct 12 to the combustion engine 11, and a high pressure inlet port C which supplies the pressure exchanger with high pressure exhaust gases of the combustion engine 11 fed through the duct 13. The drive shaft 14 of the combustion engine 11 has a pulley 16 and the drive shaft 15 of the pressure exchanger 10 has a pulley 17. The direct drive from the combustion engine 11 to the pressure exchanger 10 is achieved by the belt 18 which transmits shaft power from pulley 16 to pulley 17. The ratio of the direct drive can be achieved by various size pulleys or any other means well known in the art.

Thus referring first to FIGURES 1–4, the rotor 30 of the pressure exchanger 10 is driven for rapid rotation about its axis by means of a belt drive 18 from the combustion engine 11 placed over the pulley 17 of the rotor shaft 15. The manner in which the exhaust gases from the combustion engine are supplied to the pressure exchanger 10 and the manner in which the compressed air from the pressure exchanger 10 is supplied to the combustion engine 11 is illustrated and described in copending application Serial No. 458,771 filed September 28, 1954, now U.S. Patent No. 2,957,304, entitled Aero-Dynamic Wave Machine as a Supercharger for Reciprocating Engines, by Max Berchtold and assigned to the assignee of the instant invention. The rotor 30 has an outer shroud 33 and a plurality of channels or cells 35. The cold stationary stator plate 40 is placed at one end of the rotor 30 and the hot stationary stator plate 41 is placed at the other end of the rotor 30 in the closest possible proximity thereto consistent with both high speed rotation required in the rotor as well as variations due to expansion of the parts and still maintain the best possible fluid tight seal. The device may be provided with a fluid seal such as illustrated in copending application Serial No. 643,626, filed March 4, 1957, now abandoned, entitled Fluid Seal for Aero-Dynamic Wave Machine, by Frank John Gardiner. The stationary stator plate 41 on the right side of the rotor 30 is provided with high pressure inlet port C for the input of a first fluid at elevated pressure and temperature and a low pressure outlet port A for exhausting the first fluid at approximately ambient pressure. Stationary stator plate 40 on the left side of rotor 30 is provided with a high pressure outlet port D for the output of a second fluid at elevated pressure, which fluid is the compressed air supplied to the combustion engine 11, and low pressure inlet port B for the intake of the second fluid at ambient pressure.

Since rotor 30 of the pressure exchanger 10 is belt driven from the combustion engine 11 it rotates with the variable speed of the combustion engine but as will hereinafter be more fully described our instant invention provides a novel configuration of the high pressure outlet port D with respect to the high pressure inlet port C to maintain a controlled timing for the waves and interfaces with respect to these ports C and D.

Figure 5:
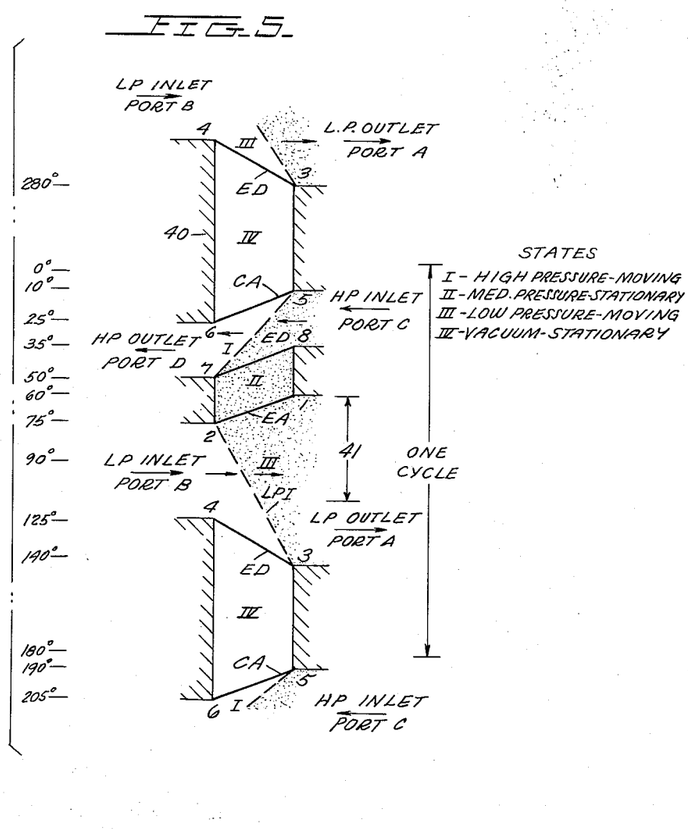
FIGURE 5 is a schematic developed view of the rotor and port showing the condition of the fluids in each section of the rotor having reverse cycle operation. This view illustrates the cycle of operation at prior art design conditions and illustrates an ideal design cycle with exact timing.

As individual channels or cells of the rotor 30 of the prior art pressure exchanger move successively past opposite ports C and D and then A and B, the creation and propagation of the various waves as well as the pressure interchanges and interfaces which occur are demonstrated in a development view of FIGURE 5. A detailed analysis of the cycle of operation is set forth in Patent No. 2,970,745, entitled Wave Engine by Max Berchtold and assigned to the assignee of the instant invention.

Within the high pressure State I the opening edges 5 and 6 of the high pressure inlet port C and high pressure outlet port D are physically related to each other and the closing edges 7 and 8 are physically related to each other. The cycle of operation is essentially independent of the length of time during which the fluid remains at State II and there is no relation between the pair of ports C, D of the high pressure stage and the pair of ports A, B of the low pressure stage.

In FIGURE 5 we have shown a cycle of operation which has "exact timing" which is defined as the termination of a wave created at an opening edge or closing edge of a high pressure inlet port at an opening edge or closing edge respectively of a high pressure outlet port.

FIGURE 5 illustrates an example of an ideal condition of the prior art in which there is complete high and low pressure scavenging of the pressure exchanger 10. The action of the waves can also be studied in FIGURE 5 by cutting a narrow slot in a piece of paper to represent a typical channel or cell 35 and sliding this slot transversely down FIGURE 5. In the illustration the first fluid, which represents the hot gas exhaust from the combustion engine 11, is represented by the dotted area, and the second fluid, which is the compressed air output of the pressure exchanger 10 into the combustion engine 11, is represented by the unmarked area. The movement of the fluid is indicated by the arrows.

The second fluid can be at ambient pressure and is always present at the low pressure inlet port B, and the first fluid is always present at the high pressure inlet port C. The cells 35 in the rotor 30 are continuously moving past the A, B, C and D ports and the closed spaces between the ports in the stator plate 40 and stator plate 41. Thus, for the purposes of description, the cycle of operation may start at any point.

At zero degree rotation the second fluid is at rest at State IV in the rotor 30 at a vacuum. The period of time that the second fluid is at rest during State IV depends only on structural conditions and does not affect the cycle of operation. When the channel has rotated approximately 10° its right end reaches the opening edge 5, thereby permitting the high pressure gas in first fluid inlet port C to impinge upon the medium pressure second fluid within the rotor. Since the total pressure in the high pressure inlet port C is higher than the pressure of the second fluid in the channel, the first fluid which leaves the high pressure inlet port C impinges with a given velocity upon the second fluid within the channel and by this action compresses the second fluid and puts it in motion. The first particles of the second fluid which are subjected to this impingement in turn push against adjacent particles and compress them, and also put these particles in motion. This mechanism creates a compression acceleration wave CA which travels faster than the second fluid now set in motion. The second fluid ahead of the wave CA is still stationary, and thus at its State IV. Behind or upstream of the wave CA both the compressed second fluid and the first fluid are in State I. Both fluids are at the same velocity and high pressure but divided by an interface identified as HPI.

When the channels have rotated approximately 25° their left end will reach the opening edge 6 in the stationary plate 40 of the high pressure outlet port D and the relationship of the opening edge 5 to the opening edge 6 is such that all of the second fluid in the cell is compressed. Thus only compressed second fluid will be moved out into the high pressure outlet port D. When the channels have rotated approximately 35° the right end is closed by the closing edge 8 of the high pressure inlet port C and no further particles of the first fluid enters the channel. Hence, the last particles of the second fluid in the channels will expand down to a given medium pressure and thereafter the next adjacent medium pressure particles, which are no longer being pushed through the channel, will expand and so on. This is the creation of an expansion deceleration wave ED which travels downstream through the channels and effectively decreases both velocity and pressure. The pressure exchanger aerodynamic wave machine 10 is designed so that as soon as the expansion deceleration wave ED reaches the left end of the channel the channel will have rotated 45° to thereby close off the left end of the channel by the closing edge 7 in the stationary plate 40 of the high pressure outlet port D so that no first fluid at medium pressure will enter the high pressure outlet port or pickup port D. It should be noted that if an aero-dynamic wave machine is designed for a specific pressure ratio such as illustrated in FIGURE 5 the opening or leading edge 5 of the high pressure inlet port or nozzle C is physically positioned with respect to the closing or trailing edge 7 of the high pressure outlet port D so that the high pressure interface HPI will arrive at the left end of the channel when the channel is rotated 45° and thereby closed off by the closing edge 7 of the high pressure outlet port D and thereby prevent any first fluid, even though at high pressure, from entering the high pressure outlet port D.

Between approximately 45° and 60° rotation, as illustrated in FIGURE 5, i.e., after the channel has passed the high pressure outlet port D and high pressure inlet C, but has not yet reached either the low pressure inlet port B or the low pressure outlet port A, the channel is closed at both ends by the stationary stator plate 40 and stationary stator plate 41 and the first fluid is stationary in the channel at medium pressure. The length of time that the first fluid remains at this State II does not affect the cycle of operation.

When the channel has rotated approximately 60°, as seen in the illustration of FIGURE 5, the right end of the channel is opened to the opening edge 1 of the low pressure outlet port A, which port is at an ambient pressure lower than the pressure in the channel. Thus, an expansion acceleration wave EA is created at the opening edge 1 and is propagated downstream through the channel. The pressure of the first fluid ahead of the wave EA is at State II, whereas the pressure behind the wave EA is at the ambient pressure existing in the low pressure outlet port A, so that the exhaust or scavenging velocity will depend on the pressured drop through the wave EA.

The aero-dynamic wave machine is designed so that as the expansion acceleration wave reaches the left hand end of the channel, the channel will be opened by the opening edge 2 of the low pressure inlet port B at approximately 75°. At this time the first fluid in the channel is exposed at its left end to the second fluid at the low pressure inlet port B and the second fluid starts flowing into the channel with the second fluid replacing the first fluid, i.e., scavenging out the first fluid. This condition continues to exist until the channel has rotated approximately 125°, at which time the left end of the channel is closed off by the closing edge 4 in the stationary stator plate 40 of the low pressure inlet port B. At this time an expansion deceleration wave ED is created at the closing edge 4, which wave travels downstream, thereby reducing the pressure of the second fluid to a pressure below ambient at State IV.

The machine is designed so that the right end of the cell is closed off by the closing edge 3 of the low pressure outlet port A when the expansion deceleration wave ED reaches the right end. At this time the channel contains only the second fluid at a vacuum and is stationary, i.e., at State IV.

When the channel has rotated 180° the complete reverse cycle operation noted above will repeat itself as illustrated in FIGURE 5 and the same cycle of operation can be repeated for the remaining ports during the second 180° rotation.

In the description of FIGURE 5, it will be noted that the aero-dynamic wave machine is operated under ideal conditions in which there is not only proper timing of the various waves and interfaces, but also the device operates at maximum efficiency. In the description thus far, it has been assumed that the aero-dynamic wave machine is operated at a fixed r.p.m., which r.p.m. enables the device to operate under near optimum conditions.

As described in the introduction of the instant application, it is desirable to have the pressure exchanger or aero-dynamic wave machine driven by the combustion engine which it is to super-charge. Thus, for example, some shaft energy from the combustion engine 11, can be supplied to the aero-dynamic wave machine by utilizing a belt drive 18 with pulleys 16 and 17. However, as will hereinafter be more fully explained in connection with FIGURES 7a, 7b, and 7c, the timing requirements and efficiency of the machine will be considerably upset with variable r.p.m. of the combustion engine and thus variable r.p.m. of the pressure exchanger unless an adjustable plate or the novel compressed air outlet port of our invention is used to re-establish timing and enable the pressure exchanger to satisfy the new mass flow requirements of the combustion engine.

Figure 6:
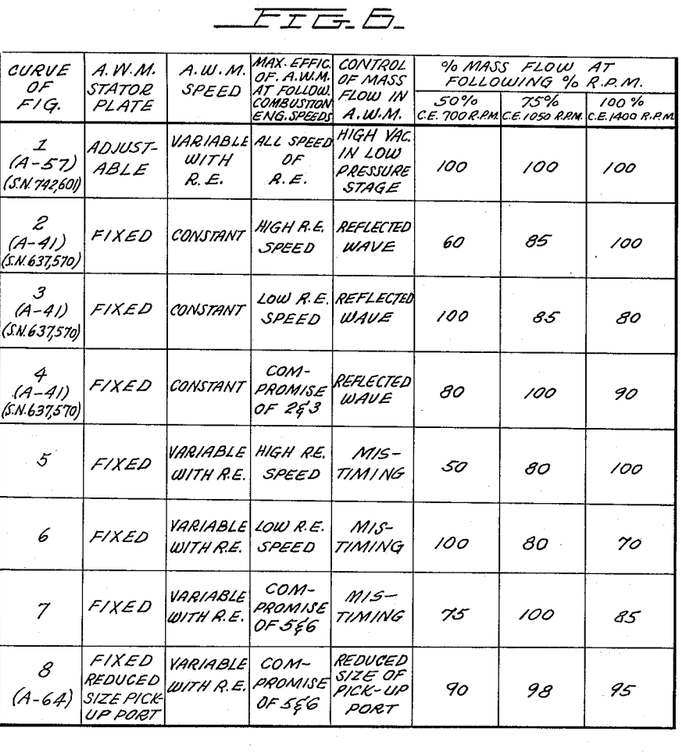
FIGURE 6 is a tabulation to compare eight conditions and show how our novel pressure exchanger compares wtih prior art pressure exchangers.
Figure 6A:
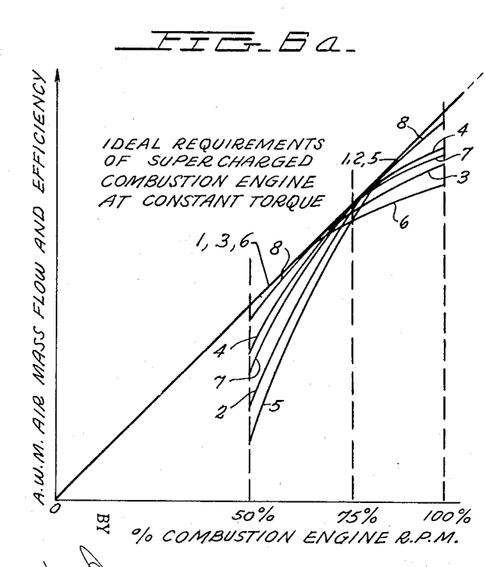
FIGURE 6a is a graphic illustration of the tabulation in FIGURE 6 plotting pressure exchanger air mass flow vs. reciprocating engine r.p.m. and illustrates the relationship for eight different conditions between requirements of a reciprocating engine and that actually delivered by an aero-dynamic wave machine used as a super-charger.

The tabulation of FIGURE 6 and the graphic illustration of FIGURE 6a will be used to summarize the characteristics of prior art devices compared to our device. As seen in the conditions of curves 2, 3 and 4 of FIGURE 6a and the tabulation of FIGURE 6, a constant speed aero-dynamic wave machine does not operate at a maximum efficiency while delivering the required mass flow to the combustion engine over the full operating speed range of the combustion engine. (See copending application S.N. 637,570, filed January 31, 1957, entitled Reverse Cycle Aero-Dynamic Wave Machine to Max Berchtold assigned to the assignee of the instant invention.) In fact, this situation is still further aggravated by a variable speed aero-dynamic wave machine as seen for curves 5, 6, 7 wherein the deviation from required mass flow of the combustion engine for variations in speed are even greater than in a constant speed aero-dynamic wave machine. By using an adjustable stator plate, it is possible to re-establish timing of the main waves to keep maximum efficiency so that there will be an approximately constant pressure output at the high pressure outlet port D as explained and described in copending application S.N. 742,601, filed June 17, 1958, entitled Adjustable Stator Plate for Variable Speed Aero-Dynamic Wave Machine, by Max Berchtold, assigned to the assignee of the instant invention.

With our novel arrangement, both stator plates 40 and 41 are stationary and there is a direct drive between the internal combustion engine and the pressure exchanger. The delivered airflow at 75% of the maximum speed is only slightly reduced to 98% since there is only minor mistiming without any back flow into the rotor. However at 100% speed, maintaining the same engine exhaust gas temperature, the mistiming becomes more noticeable and the mass flow reduces to about 95%. At 50% rotor speed the losses due to mistiming cause a reduction in mass flow to about 90% of the mass flow which is obtained in the case with the constant speed pressure exchanger. These conditions of our novel device are shown in the tabulation of FIGURE 6 as condition 8 and are also graphically illustrated in curve 8 in FIGURE 6a. It will be noted that the arrangement of our invention illustrated as condition 8 and curve 8 is superior in performance to all other arrangements except the adjustable plate illustrated as condition I and curve I. However, the adjustable plate arrangement is a complicated mechanical construction which increases the cost, increases mechanical failure, requires more maintenance and mechanical adjustments. Thus our novel pressure exchanger has an efficiency which is slightly reduced over the range of speed operation when compared to the more expensive and complicated adjustable plate arrangement, but has a consistently higher efficiency over the range of speed operation than all other prior art pressure exchangers even though there is no increase in either cost or mechanical complexity.

Figure 7A:
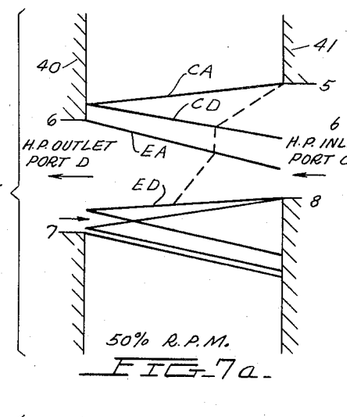
FIGURE 7a is a partial schematic developed view of the rotor and ports showing the condition of the fluids in the high pressure section of the rotor of a prior art pressure exchanger having stationary stator plates and driven at 50% of maximum speed.
Figure 7B:
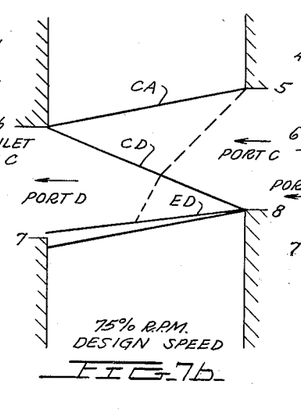
FIGURE 7b is a view similar to FIGURE 7a and illustrates the condition within the rotor when the pressure exchanger is driven at 75% of maximum speed, which was considered design speed.
Figure 7C:
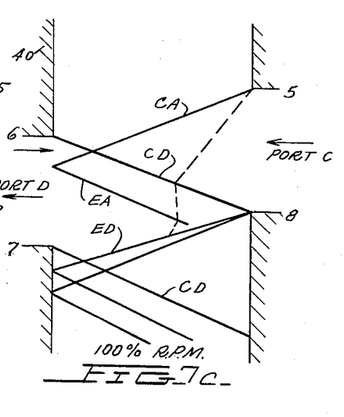
FIGURE 7c is a view similar to FIGURE 7a and illustrates the condition within the rotor when the pressure exchanger is driven at 100% of maximum speed.
Figure 8A:
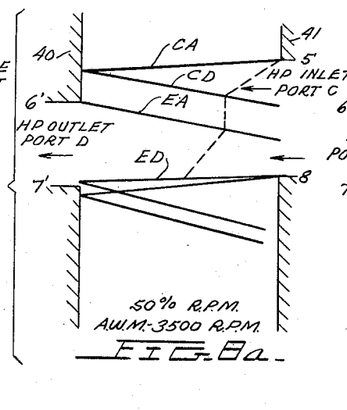
FIGURE 8a is a partial schematic developed view of the rotor and ports showing condition of fluids in the high pressure section of the rotor of our novel pressure exchanger having stationary stator plates and driven at 50% of maximum speed.
Figure 8B:
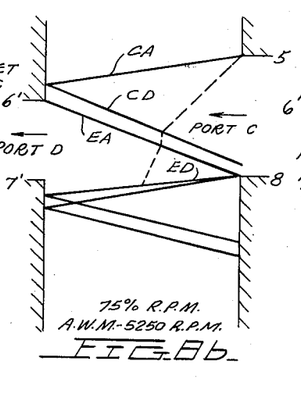
FIGURE 8b is a view similar to FIGURE 8a and illustrates the condition within the rotor when our novel pressure exchanger is driven at 75% of maximum speed.
Figure 8C:
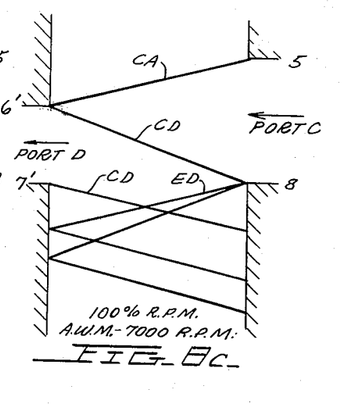
FIGURE 8c is a view similar to FIGURE 8a and illustrates the condition within the rotor when our novel pressure exchanger is driven at 100% of maximum speed.

In FIGURES 7a, 7b and 7c, we have shown the wave diagram of the high pressure stage of a prior art pressure exchanger when operated at various speeds and in FIGURES 8a, 8b, and 8c we have shown the wave diagram of the high pressure stage of a pressure exchanger with our invention the same various speeds so that an accurate comparison can be made between the two. FIGURE 7b, is in fact, taken from the ideal cycle of FIGURE 5 and shows the compression acceleration wave CA and expansion deceleration wave ED at design speed, i.e., 75% of maximum r.p.m. It will be noted that wave CA which originates on the opening edge 5 of the high pressure inlet port D terminates on the closing edge 6 of the high pressure outlet port D and the wave ED which originates on the closing edge 8 of the high pressure inlet port C terminates on the closing edge 7 of the high pressure outlet port D.

However, if the pressure exchanger is slowed down to 50% of maximum r.p.m. as seen in FIGURE 7a, waves CA and ED arrive at the stator plate 40 ahead of the edges 6 and 7 respectively and, as illustrated, there will be an undesirable back-flow from the high pressure outlet port D back into the rotor near the closing edge 7. Also when the speed is increased to 100% of maximum r.p.m., as seen in FIGURE 7c, the waves CA and ED arrive at the stator plate 40 after the edges 6 and 7 respectively and, as illustrated, there will also be an undesirable back-flow from the high pressure outlet port D into the rotor near the opening edge 6.

The undesirable back-flow at 50% of maximum r.p.m. in FIGURE 7a and 100% of maximum r.p.m. in FIGURE 7b is eliminated in our novel device as can best be seen by a comparison of FIGURE 7a with 8a, FIGURE 7b with FIGURE 8c.

In our novel device the high pressure outlet port D is considerably reduced in angular width so that at the design speed on 75% of maximum r.p.m. as seen in FIGURE 8b, there is an intentional mis-timing of wave CA and ED. That is, the opening edge 6' is angularly positioned with respect to the opening edge 5 so that the wave CA arrives ahead of the edge 6' and the closing edge 7' is angularly positioned with respect to the closing edge 8 so that the wave ED arrives after the edge 7'. Since there is only slight mis-timing of the waves CA and ED there is a full and undisturbed flow into the compressed discharge port resulting in only a slight reduction of the air flow to about 98% of the mass flow delivered in the case of the full size port D shown in FIGURE 5. When the speed is reduced to 50% of the maximum r.p.m. as illustrated in FIGURE 8a the wave CA arrives ahead of the closing edge 6' but the wave ED has exact timing as it terminates on the closing edge 7' of the high pressure outlet port D. With this condition there is no back-flow from the high pressure outlet port D into the rotor since only the wave CA is mis-timed, the pressure exchanger is capable of still delivering 90% of the mass flow which an ideally timed cycle would deliver. When the speed is increased to 100% of the maximum r.p.m., as illustrated in FIGURE 8c the wave CA will be exactly timed and will terminate on the opening edge 6' of the high pressure outlet port D but wave ED is mis-timed and drives after the closing edge 7' of the high pressure outlet port D. With this condition there will be no backflow from the high pressure outlet port D into the rotor since only the wave ED is mis-timed. The pressure exchanger is capable of delivering 95% of the mass flow an ideally timed cycle would be capable to deliver.

Thus, we have provided a novel relation between the high pressure outlet port and high pressure inlet port whereby the wave timing can be controlled for various r.p.m. of the rotor to maintain a high pressure at the high pressure outlet port and also modify mass flow to substantially meet the requirements of a combustion engine.

Thus our invention is particularly adaptable to an aero-dynamic wave machine (pressure exchanger) driven by and super-charging a reciprocating combustion engine wherein the combustion engine has a wide variation in speed and in which it is desirable to maintain a substantially constant torque for the engine.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. A pressure exchanger having a rotor, a stationary first stator plate, a stationary second stator plate, a variable speed drive for said rotor, said rotor being comprised of a plurality of channels to guide fluid from one end of said rotor to the other end of said rotor, said first stator plate being positioned at a first end of said rotor and said second stator plate being positioned at a second end of said rotor; said first stator plate having a high pressure inlet port; said second stator plate having a high pressure outlet port; a low pressure inlet port in one of said stator plates and a low pressure outlet port in one of said stator plates; each of said ports having an opening edge and a closing edge; said rotor being driven at least at a first, second and third speed in which said second speed is greater than said first speed and said third speed is greater than said second speed; said opening edge of said high pressure outlet port being angularly positioned with respect to said opening edge of said high pressure inlet port so that a compression wave created at the opening edge of said high pressure inlet port terminates at said opening edge of said high pressure outlet port only when said rotor is being driven at said third speed; said closing edge of said high pressure outlet port being angularly positioned with respect to said closing edge of said high pressure inlet port so that an expansion wave created at the closing edge of said high pressure inlet port terminates at said closing edge of said high pressure outlet port only when said rotor is being driven at said first speed.

2. A pressure exchanger having a rotor, a stationary first stator plate, a stationary second stator plate, a variable speed drive for said rotor, said rotor being comprised of a plurality of channels to guide fluid from one end of said rotor to the other end of said rotor, said first stator plate being positioned at a first end of said rotor and said second stator plate being positioned at a second end of said rotor; said first stator plate having a high pressure inlet port; said second stator plate having a high pressure outlet port; a low pressure inlet port in one of said stator plates and a low pressure outlet port in the other of said stator plates; each of said ports having an opening edge and a closing edge; said rotor being driven at least at a first, second and third speed in which said second speed is greater than said first speed and said third speed is greater than said second speed; said opening edge of said high pressure outlet port being angularly positioned with respect to said opening edge of said high pressure inlet port so that a compression wave created at the opening edge of said high pressure inlet port terminates at said opening edge of said high pressure outlet port only when said rotor is being driven at said third speed; said closing edge of said high pressure outlet port being angularly positioned with respect to said closing edge of said high pressure inlet port so that an expansion wave created at the closing edge of said high pressure inlet port terminates at said closing edge of said high pressure outlet port only when said rotor is being driven at said first speed; said compression wave terminating on said second stator plate ahead of said opening edge of said high pressure outlet port when said rotor is being driven at said first and second speed.

3. A pressure exchanger having a rotor, a stationary first stator plate, a stationary second stator plate, a variable speed drive for said rotor, said rotor being comprised of a plurality of channels to guide fluid from one end of said rotor to the other end of said rotor, said first stator plate being positioned at a first end of said rotor and said second stator plate being positioned at a second end of said rotor; said first stator plate having a high pressure inlet port; said second stator plate having a high pressure outlet port; a low pressure inlet port in one of said stator plates and a low pressure outlet port in the other of said stator plates; each of said ports having an opening edge and a closing edge; said rotor being driven at least at a first, second and third speed in which said second speed is greater than said first speed and said third speed is greater than said second speed; said opening edge of said high pressure outlet port being angularly positioned with respect to said opening edge of said high pressure inlet port so that a compression wave created at the opening edge of said high pressure inlet port terminates at said opening edge of said high pressure outlet port only when said rotor is being driven at said third speed; said closing edge of said high pressure outlet port being angularly positioned with respect to said closing edge of said high pressure inlet port so that an expansion wave created at the closing edge of said high pressure inlet port terminates at said closing edge of said high pressure outlet port only when said rotor is being driven at said first speed, said expansion wave terminating on said second stator plate after said closing edge of said high pressure outlet port when said rotor is being driven at said second and third speed.

4. A pressure exchanger having a rotor, a stationary first stator plate, a stationary second stator plate, a variable speed drive for said rotor, said rotor being comprised of a plurality of channels to guide fluid from one end of said rotor to the other end of said rotor, said first stator plate being positioned at a first end of said rotor and said second stator plate being positioned at a second end of said rotor; said first stator plate having a high pressure inlet port; said second stator plate having a high pressure outlet port; a low pressure inlet port in one of said stator plates and a low pressure outlet port in the other of said stator plates; each of said ports having an opening edge and a closing edge; said rotor being driven at least at a first, second and third speed in which said second speed is greater than said first speed and said third speed is greater than said second speed; said opening edge of said high pressure outlet port being angularly positioned with respect to said opening edge of said high pressure inlet port so that a compression wave created at the opening edge of said high pressure inlet port terminates at said opening edge of said high pressure outlet port only when said rotor is being driven at said third speed; said closing edge of said high pressure outlet port being angularly positioned with respect to said closing edge of said high pressure inlet port so that an expansion wave created at the closing edge of said high pressure inlet port terminates at said closing edge of said high pressure outlet port only when said rotor is being driven at said first speed; said compression wave terminating on said second stator plate ahead of said opening edge of said high pressure outlet port when said rotor is being driven at said first and second speed; said expansion wave terminating on said second stator plate after said closing edge of said high pressure outlet port when said rotor is being driven at said second and third speed.

5. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first stator plate having a high pressure inlet port; said second stator plate having a high pressure outlet port; a low pressure outlet port in one of said stator plates; a low pressure inlet port in the other of said stator plates; each of said ports having an opening edge and a closing edge; a variable speed drive to drive said rotor at least at a first, second and third speed; said second speed being greater than said first speed and said third speed being greater than said second speed; a first wave created in one of said channels when said channel is opened by said high pressure inlet port; a second wave created in said channel when said channel is closed by the closing edge of said high pressure inlet port; the opening and closing edges of said high pressure outlet port being angularly positioned with respect to the opening and closing edges of said high pressure inlet port to open said channel when a first wave arrives at said second end of said rotor only when said rotor is being driven at said third speed and to close said channel when a second wave arrives at said second end of said rotor only when said rotor is being driven at said first speed.

6. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first stator plate having a high pressure inlet port; said second stator plate having a high pressure outlet port; a low pressure outlet port in one of said stator plates; a low pressure inlet port in the other of said stator plates; each of said ports having an opening edge and a closing edge; a variable speed drive to drive said rotor at least at a first, second and third speed; said second speed being greater than said first speed and said third speed being greater than said second speed; a first wave created in one of said channels when said channel is opened by said high pressure inlet port; a second wave created in said channel when said channel is closed by the closing edge of said high pressure inlet port; the opening and closing edges of said high pressure outlet port being angularly positioned with respect to the opening and closing edges of said high pressure inlet port to open said channel when a first wave arrives at said second end of said rotor only when said rotor is being driven at said third speed and to close said channel when a second wave arrives at said second end of said rotor only when said rotor is being driven at said first speed; said channel remaining closed by said second stator plate as a first wave arrives at said second end of said rotor when said rotor is being driven at said first and second speed.

7. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first stator plate having a high pressure inlet port; said second stator plate having a high pressure outlet port; a low pressure outlet port in one of said stator plates; a low pressure inlet port in the other of said stator plates; each of said ports having an opening edge and a closing edge; a variable speed drive to drive said rotor at least at a first, second and third speed; said second speed being greater than said first speed and said third speed being greater than said second speed; a first wave created in one of said channels when said channel is opened by said high pressure inlet port; a second wave created in said channel when said channel is closed by the closing edge of said high pressure inlet port; the opening and closing edges of said high pressure outlet port being angularly positioned with respect to the opening and closing edges of said high pressure inlet port to open said channel when a first wave arrives at said second end of said rotor only when said rotor is being driven at said third speed and to close said channel when a second wave arrives at said second end of said rotor only when said rotor is being driven at said first speed; said channel being closed by the closing edge of said high pressure outlet port before a second wave arrives at said second end of said rotor when said rotor is being driven at said second and third speed.

8. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first stator plate having a high pressure inlet port; said second stator plate having a high pressure outlet port; a low pressure outlet port in one of said stator plates; a low pressure inlet port in the other of said stator plates; each of said ports having an opening edge and a closing edge; a variable speed drive to drive said rotor at least at a first, second and third speed; said second speed being greater than said first speed and said third speed being greater than said second speed; a first wave created in one of said channels when said channel is opened by the opening edge of said high pressure inlet port; a second wave created in said channel when said channel is closed by the closing edge of said high pressure inlet port; the opening and closing edges of said high pressure outlet port being angularly positioned with respect to the opening and closing edges of said high pressure inlet port to open said channel when a first wave arrives at said second end of said rotor only when said rotor is being driven at said third speed and to close said channel when a second wave arrives at said second end of said rotor only when said rotor is being driven at said first speed; said channel remaining closed by said second stator plate as a first wave arrives at said second end of said rotor when said rotor is being driven at said first and second speed; said channel being closed by the closing edge of said high pressure outlet port before a second wave arrives at said second end of said rotor when said rotor is being driven at said second and third speed.

9. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first and second stator plates each having at least two ports communicating with said channels to thereby deliver fluid to and from said rotor; a high pressure inlet port in said first stator plate; a high pressure outlet port in said second stator plate; a low pressure outlet port in one of said stator plates and a low pressure inlet port in the other of said stator plates; said rotor being driven at variable speeds of at least a first, second and third speed wherein said second speed is greater than said first speed and said third speed is greater than said second speed; said high pressure outlet port being smaller than said high pressure inlet port; said high pressure outlet port being angularly positioned with respect to the angular position of said high pressure inlet port to provide exact timing of a first wave created at an opening edge of said high pressure inlet port only when said rotor is rotated at said third speed and to provide exact timing of a second wave created at a closing edge of said high pressure inlet port only when said rotor is rotated at said first speed.

10. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first and second stator plates each having at least two ports communicating with said channels to thereby deliver fluid to and from said rotor; a high pressure inlet port in said first stator plate; a high pressure outlet port in said second stator plate; a low pressure outlet port in one of said stator plates and a low pressure inlet port in the other of said stator plates; said rotor being driven at variable speeds of at least a first, second and third speed wherein said second speed is greater than said first speed and said third speed is greater than said second speed; said high pressure outlet port being smaller than said high pressure inlet port; said high pressure outlet port being angularly positioned with respect to the angular position of said high pressure inlet port to provide exact timing of a first wave created at an opening edge of said high pressure inlet port only when said rotor is rotated at said third speed and to provide exact timing of a second wave created at a closing edge of said high pressure inlet port only when said rotor is rotated at said first speed; a first wave terminating on said second stator plate ahead of said high pressure outlet port when said rotor is rotated at said first and second speed.

11. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first and second stator plates each having at least two ports communicating with said channels to thereby deliver fluid to and from said rotor; a high pressure inlet port in said first stator plate; a high pressure outlet port in said second stator plate; a low pressure outlet port in one of said stator plates and a low pressure inlet port in the other of said stator plates; said rotor being driven at variable speeds of at least a first, second and third speed wherein said second speed is greater than said first speed and said third speed is greater than said second speed; said high pressure outlet port being smaller than said high pressure inlet port; said high pressure outlet port being angularly positioned with respect to the angular position of said high pressure inlet port to provide exact timing of a first wave created at an opening edge of said high pressure inlet port only when said rotor is being rotated at said third speed and to provide exact timing of a second wave created at a closing edge of said high pressure inlet port only when said rotor is rotated at said first speed; a second wave terminating on said second stator plate after said high pressure outlet port when said rotor is rotated at said second and third speed.

12. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; said first and second stator plates each having at least two ports communicating with said channels to thereby deliver fluid to and from said rotor; a high pressure inlet port in said first stator plate; a high pressure outlet port in said second stator plate; a low pressure outlet port in one of said stator plates and a low pressure inlet port in the other of said stator plates; said rotor being driven at variable speeds of at least a first, second and third speed wherein said second speed is greater than said first speed and said third speed is greater than said second speed; said high pressure outlet port being smaller than said high pressure inlet port; said high pressure outlet port being angularly positioned with respect to the angular position of said high pressure inlet port to provide exact timing of a first wave created at an opening edge of said high pressure inlet port only when said rotor is rotated at said third speed and to provide exact timing of a second wave created at a closing edge of said high pressure inlet port only when said rotor is rotated at said first speed; a first wave terminating on said second stator plate ahead of said high pressure outlet port when said rotor is rotated at said first and second speed; a second wave terminating on said second stator plate after said high pressure outlet port when said rotor is rotated at said second and third speed.

13. A pressure exchanger having a rotor, a stationary first stator plate and a stationary second stator plate; said rotor being comprised of a plurality of channels to guide fluid from one end of said rotor to the other end of said rotor; said first stator plate being positioned adjacent a first end of said rotor; said second stator plate being positioned adjacent a second end of said rotor; a high pressure inlet port in said first stator plate; a high pressure outlet port in said second stator plate; a low pressure outlet port in one of said stator plates and a low pressure inlet port in the other of said stator plates; said rotor being driven at variable speeds of at least a first, second and third speed wherein said second speed is greater than said first speed and said third speed is greater than said second speed; said high pressure outlet port being smaller in size than said high pressure inlet port; said high pressure outlet port being angularly positioned with respect to the angular position of said high pressure inlet port to provide exact timing of a first wave created at an opening edge of said high pressure inlet port only when said rotor is rotated at said third speed and to provide exact timing of a second wave created at a closing edge of said high pressure inlet port only when said rotor is rotated at said first speed; a first wave terminating on said second stator plate ahead of said high pressure outlet port when said rotor is rotated at said first and second speed; a second wave terminating on said second stator plate after said high pressure outlet port when said rotor is rotated at said second and third speed.

No references cited.